(12) United States Patent
Taskov

(10) Patent No.: US 9,104,563 B2
(45) Date of Patent: Aug. 11, 2015

(54) SELF-TUNING STATISTICAL RESOURCE LEAK DETECTION

(75) Inventor: Alexander Taskov, Smithtown, NY (US)

(73) Assignee: Microsoft Technology Licensing, LLC, Redmond, WA (US)

(*) Notice: Subject to any disclaimer, the term of this patent is extended or adjusted under 35 U.S.C. 154(b) by 682 days.

(21) Appl. No.: 13/370,148

(22) Filed: Feb. 9, 2012

(65) Prior Publication Data

US 2013/0211762 A1 Aug. 15, 2013

(51) Int. Cl.
*G06F 11/07* (2006.01)
*G06F 11/34* (2006.01)
*G06F 11/36* (2006.01)

(52) U.S. Cl.
CPC .......... *G06F 11/073* (2013.01); *G06F 11/0754* (2013.01); *G06F 11/3452* (2013.01); *G06F 11/366* (2013.01)

(58) Field of Classification Search
None
See application file for complete search history.

(56) References Cited

U.S. PATENT DOCUMENTS

| | | | |
|---|---|---|---|
| 6,629,266 B1 | 9/2003 | Harper et al. | |
| 7,487,321 B2 | 2/2009 | Muthiah et al. | |
| 7,761,852 B2 | 7/2010 | Gilgen et al. | |
| 7,793,161 B2 * | 9/2010 | Chen et al. | 714/47.2 |
| 7,895,588 B2 | 2/2011 | Rossmann | |
| 8,504,878 B2 * | 8/2013 | Otenko | 714/42 |
| 2006/0129992 A1 | 6/2006 | Oberholtzer et al. | |
| 2007/0136402 A1 | 6/2007 | Grose et al. | |
| 2007/0244676 A1 | 10/2007 | Shang et al. | |
| 2010/0005341 A1 | 1/2010 | Agarwal et al. | |
| 2011/0252276 A1 | 10/2011 | Tsai et al. | |
| 2012/0216076 A1 * | 8/2012 | Macik et al. | 714/38.1 |

OTHER PUBLICATIONS

International Search Report and Written Opinion, PCT/US2013/024557, Apr. 29, 2013, 9 Pages.
Wright, et al., "Auto-pilot: A Platform for System Software Benchmarking", Retrieved at <<http://am-utils.org/docs/apv2/apv2.html>>, Annual USENIX Technical Conference, FREENIX Track, Feb. 25, 2005, pp. 175-187.

(Continued)

*Primary Examiner* — Aditya Bhat
(74) *Attorney, Agent, or Firm* — Henry Gabryjelski; Kate Drakos; Micky Minhas

(57) ABSTRACT

Self-tuned detection of memory leaks or other resource leaks is described. Sample size and sample rate are set manually or computationally selected. Self-tuning leak detection code uses one or more self-tuning mechanisms to exclude outlier sample points, to perform a second order linear regression, and/or to identify a derivative of a sequence of linear regression slopes. Statistical analysis computationally proactively determines what trend is present: upward, steady, or downward. Analysis may compare a linear regression slope to a threshold at which the slope realizes an upward trend, possibly only after crossing the threshold a specified number of times. Regression calculation may be optimized by setting an origin to the median of the time values and setting a scale to their constant time interval. A watchdog may use self-tuned detection to monitor processes, for efficiently recycling processes to prevent problems caused by resource loss.

20 Claims, 10 Drawing Sheets

(56) References Cited

OTHER PUBLICATIONS

Tsai, et al., "Low-Overhead Run-Time Memory Leak Detection and Recovery", Retrieved at <<http://www.tsai-family.com/tim_work/pubs/prdc06.pdf>>, 12th Pacific Rim International Symposium on Dependable Computing (PRDC'06), Dec. 18-20, 2007, pp. 329-340.

Carrozza, et al., "Memory Leak Analysis of Mission-Critical Middleware", Retrieved at <<http://wpage.unina.it/roberto.natella/papers/natella_leakanalysis_jss_2010.pdf>>, Journal of Systems and Software, vol. 83, No. 9, May 5, 2010, pp. 27.

* cited by examiner

SELF-TUNING STATISTICAL RESOURCE LEAK DETECTION

BACKGROUND

During execution, software often uses resources such as volatile memory (e.g., RAM), non-volatile or persistent memory (e.g., disk space), files (in volatile and/or persistent memory), processor cycles, sockets, peripheral or I/O devices (e.g., transmitters, receivers, scanners, robotic mechanisms), and so on. When a desired use of such a resource is to be exclusive, or when the requested use will be coordinated with other requests, an allocation of the resource typically precedes use of the resource. Allocation made during execution of software is sometimes called "dynamic allocation". Dynamic allocation of shared resources is managed through resource managers, locks or other access restrictions, and other mechanisms.

For example, software routinely allocates memory for use, and then frees the memory so it can be deallocated by the memory manager and made available for subsequent use, by the same code or another piece of software, in an organized and reliable manner. When memory or another resource is allocated dynamically but not properly freed, the extent of the resource's availability decreases unnecessarily. Loss of resource availability can lead to undesirable results such as slowdowns in execution or even program failure. In such cases of inadequate deallocation of a resource, one speaks of a "leak" occurring in the resource's usage. Various approaches have been taken to prevent, detect, and/or remedy such leaks.

SUMMARY

Memory leaks and other leaks in the availability of allocated resources can lead to software inefficiency and even to software failure. To avoid failure, some approaches recycle (terminate and re-start) software processes that might otherwise succumb to leakage. However, frequently recycling processes can be expensive and resource intensive, and may reduce the software's ability to handle workloads. Accordingly, some embodiments described herein provide tools for programmatically detecting when a process is leaking, so that processes can be recycled only when needed. Memory leaks are used as an example, but other resources can be similarly monitored.

Some embodiments computationally and proactively perform self-tuned memory leak or other resource leak detection. A set of resource usage sample points is presumed to be available or obtainable. The sample points show usage of allocated resource(s) by resource user(s) such as a coroutine, thread, task, interrupt handler, application, operating system driver, procedure, or object method, for example. Each sample point includes a sample time and a memory or other resource usage size. The sample points implicitly (and sometimes explicitly) have a mean, a median, a standard deviation, a sample size, a sampling rate, and other familiar statistical characteristics. Sample size and/or sample rate are set manually in some embodiments, and are computationally selected (not given as user input) in some other embodiments.

After noting at least some of the sample points, some embodiments self-tune noted sample points for leak detection by computationally proactively utilizing at least one of the following tuning mechanisms: (a) excluding any noted sample point that is an outlier, namely, not located within a specified band (e.g., one standard deviation) of the mean or median, (b) double smoothing noted sample points by performing a second order linear regression based on them, (c) identifying a derivative of a sequence of linear regression slopes. Two or all three self-tuning mechanisms may be used in a given embodiment. Tuning and/or other analysis may be implemented by a self-tuning resource usage leak detection code residing in a memory and executable by a processor. The embodiments statistically analyze a tuning mechanism result, thereby computationally proactively determining what trend is shown by the analyzed sample points. A trend may be upward, steady (basically flat), downward, or inconclusive (no clear trend that is up, down, or steady).

For example, some embodiments proactively compute a linear regression slope that has an absolute value greater than zero and less than 0.2, and the analysis determines that noted resource usage sizes are holding steady rather than trending upward. A threshold other than 0.2 may also be used; thresholds may be set manually by a user, or determined automatically by an embodiment.

In some embodiments, analysis compares a linear regression slope to a slope magnitude threshold at which the regression slope realizes an upward trend. In some, analysis compares the linear regression slope to a slope magnitude threshold, and the regression slope realizes an upward trend only after crossing the slope magnitude threshold at least a slope frequency threshold number of times. The slope frequency threshold is greater than one.

In some embodiments, noted sample times include t values which occur at a constant time interval and have a median. In some such cases, the analysis is optimized in that analysis proactively computes a linear regression slope at least in part by resetting an origin to the median of the t values and setting a scale to the constant time interval of the t values.

Some embodiments include outlier resource usage sample points that were excluded from trend analysis by the leak detection code. Some include a plurality of linear regression slopes based on at least some of the resource usage sample points, as well as a second order linear regression that is based on the plurality of linear regression slopes. Some include a plurality of linear regression slopes based on at least some of the resource usage sample points, as well as a derivative of the plurality of linear regression slopes. Some include a sample size selection code which upon execution computationally selects (as opposed to having a user select) a sample size for the plurality of resource usage sample points.

The examples given are merely illustrative. This Summary is not intended to identify key features or essential features of the claimed subject matter, nor is it intended to be used to limit the scope of the claimed subject matter. Rather, this Summary is provided to introduce—in a simplified form— some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
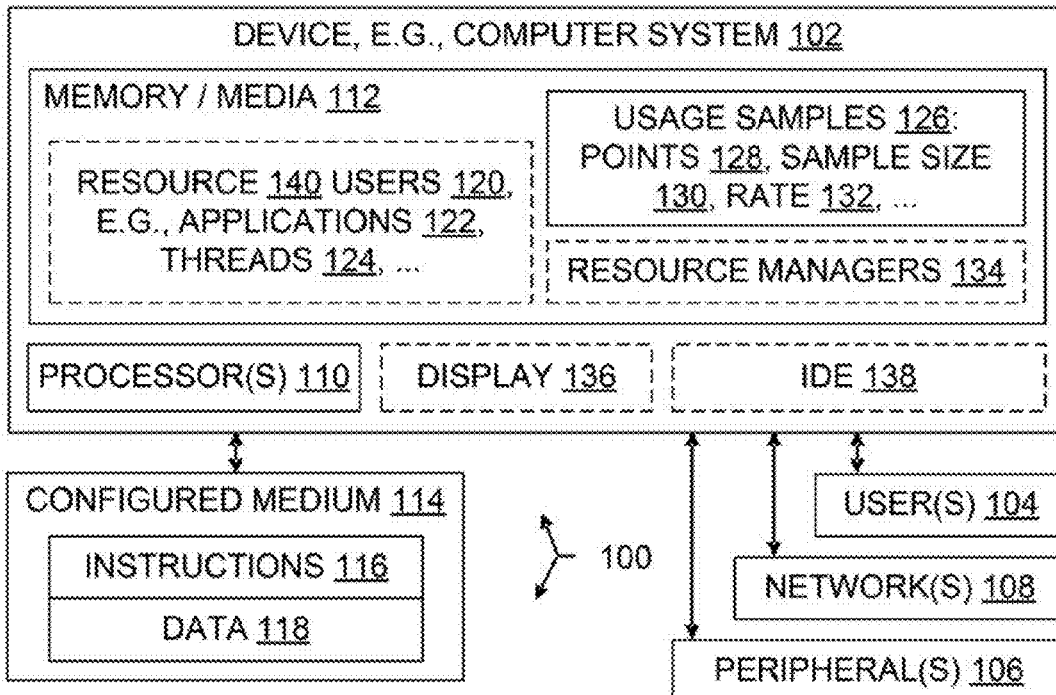
FIG. 1 is a block diagram illustrating a computer system having at least one processor, at least one memory, at least one application or other user of dynamically allocated resource(s), and other items in an operating environment which may be present on multiple network nodes, and also illustrating configured storage medium embodiments.

High availability software services such as Microsoft's Internet Information Services (IIS) or other services sometimes rely on long-running processes. Despite the best efforts of a vendor, processes may contain coding errors that cause memory leaks, which can lead to the instability of the system in question. Some such services rely on recycling their component processes periodically to prevent instability issues before they happen. For example, in IIS if a worker process currently serving an application pool terminates, then the WWW Service (W3SVC), acting as the parent process to the worker processes, restarts a new process in place of the terminated one. In some cases when a worker process terminates a new one is started simultaneously (so-called "overlapped recycling"). However, frequently recycling processes can be expensive and resource intensive and may reduce the services' ability to be accessed or otherwise handle their workload.

Accordingly, it would be beneficial to programmatically detect when a process is leaking memory so that processes can be recycled only when needed. Such an approach may involve a watchdog process that is able to monitor the memory behavior of the service(s) and indicate when a service should be recycled.

Some embodiments described herein use statistical methods to detect when a pattern of memory usage for a process indicates that memory is leaking. Specifically, some embodiments use a least squares linear regression to help establish a trend line to model the memory usage and to limit the influence of random stray values. Based on this trend, one can make a manual or automatic decision whether to recycle the process being monitored. Some embodiments provide programmatic detection of memory leaks with little or no significant overhead or disruption to users. Some use linear regression for memory leak detection, in combination with a band-based approach to eliminate outliers and/or other self-tuning approaches that can reduce or eliminate reliance on thresholds or other input from human administrators.

Some embodiments described herein may be viewed in a broader context. For instance, concepts such as sampling, tuning, linear regression, standard deviation, dynamic resource allocation, proactivity, derivatives, and thresholds may be relevant to a particular embodiment. However, it does not follow from the availability of a broad context that exclusive rights are being sought herein for abstract ideas; they are not. Rather, the present disclosure is focused on providing appropriately specific embodiments. Other media, systems, and methods involving sampling, tuning, linear regression, standard deviation, dynamic resource allocation, proactivity, derivatives, and/or thresholds are outside the present scope. Accordingly, vagueness and accompanying proof problems are also avoided under a proper understanding of the present disclosure.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventor asserts and exercises his right to his own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

"Process" is sometimes used herein as a term of the computing science arts, and in that sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Those of skill will understand which meaning is intended in a particular instance, and will also understand that a given claimed process (in the patent law sense) may be implemented using one or more processes (in the computing science sense).

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise beyond the scope of human performance alone. "Computational steps" are steps performed computationally. Neither "automatically" nor "computationally" necessarily means "immediately".

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated feature is present. For example, "resource(s)" means "one or more resources" or equivalently "at least one resource".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as allocating, analyzing, computing, crossing, detecting, determining, doing, excluding, executing, having, holding, identifying, including, noting, occurring, operating, performing, receiving, resetting, residing, sampling, self-tuning, setting, showing, smoothing, testing, trending, tuning, using, utilizing (and allocates, allocated, analyzes, analyzed, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper or in a person's mind, for example. No claim covers a signal per se.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, and/or optical media, as opposed to media that merely propagates a signal. In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other memory storage devices which are not readily removable by users 104. Neither a computer-readable medium nor a computer-readable memory includes a signal per se.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other operations.

At least one resource user 120 such as an application 122, threads 124, and/or concomitant a database, spreadsheet, project files, and the like, other software, and other items shown in the Figures and/or discussed in the text, may each reside partially or entirely within one or more media 112, thereby configuring those media. One or more usage samples 126 show usage of memory and/or other resources 140 by the resource user(s) 120. Each sample 126 includes sample points 128 and has characteristics such as a sample size 130, sample frequency 132 (sometimes called a sample rate 132), and the like. Memory manager(s) and/or other resource managers 134 may reside on the system 102 that holds the sample(s) 126, and/or on other systems. The managed resource(s) 140 are not necessarily resources of the system on which the samples 126 are stored and/or analyzed. In addition to processor(s) 110, memory 112, and display(s) 136, an operating environment may also include other hardware, such as buses, power supplies, and accelerators, for instance.

A given operating environment 100 may include an Integrated Development Environment (IDE) 138 which provides a developer with a set of coordinated software development tools. In particular, some of the suitable operating environments for some embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C# ("C-Sharp"), but teachings herein are applicable with a wide variety of programming languages, programming models, and programs, as well as with endeavors outside the field of software development per se that use and/or monitor usage of memory and/or other dynamically allocated resources.

One or more items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
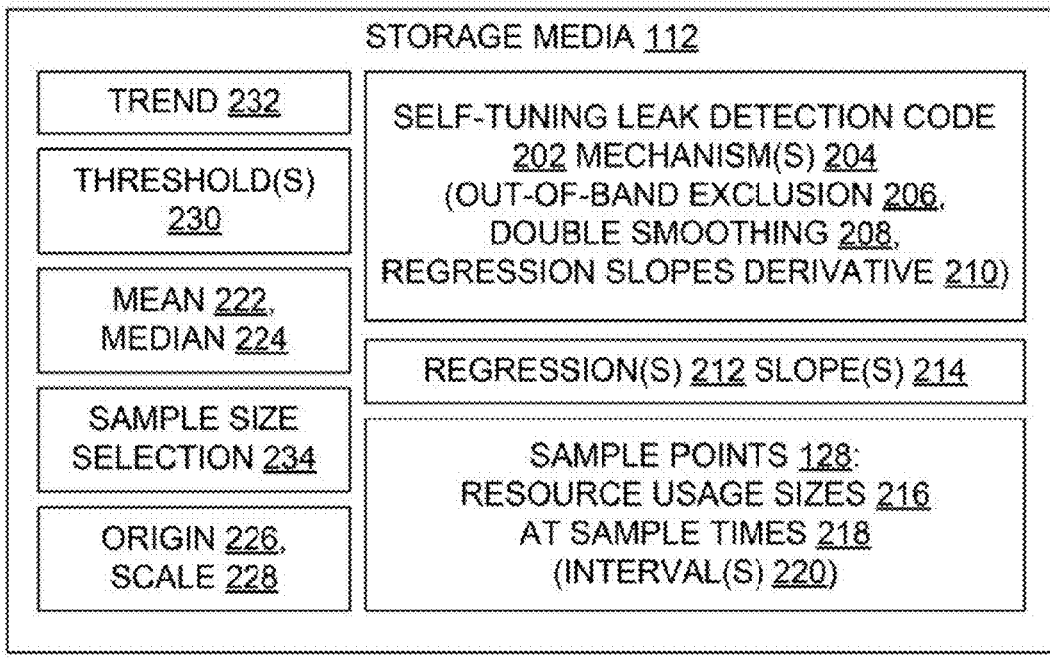
FIG. 2 is a block diagram illustrating self-tuned statistical resource leak detection in an example architecture.

FIG. 2 illustrates an architecture which is suitable for use with some embodiments. Self-tuning leak detection code 202 includes one or more self-tuning mechanisms 204 which help reduce, or in some cases eliminate, manual tuning by human user(s) 104 of leak detection thresholds and other parameters. One mechanism 204 described herein is an out-of-band exclusion mechanism 206 which filters out sample points 128 that are deemed out-of-band outliers, so they do not influence trend line analysis. Another mechanism 204 is a double smoothing mechanism 208 which smoothes the impact of outliers (in-band) by second order linear regression, namely, a linear regression on linear regressions 212. A third mechanism 204 is a regression slopes derivative mechanism 210 which decreases the effect of outliers (in-band) by using a slope of a curve defined by linear regressions 212.

In some embodiments, the linear regression(s) 212 are based on non-excluded sample points 128 and they define respective regression slope(s) 214 using familiar linear regression calculations. However, the input to regression calculations may be subject to exclusion 206 and/or the output of regression calculations may be input to double smoothing 208 and/or to derivative 210 mechanisms (or equivalently, to processes using such mechanisms).

In some embodiments, each sample point 128 includes a resource usage size 216 and a sample time 218. Sample points may track one or multiple resources 140. Samples may be evenly separated in time at some constant interval 220, or unevenly separated in time. Samples 126 implicitly (calculation possible) and sometimes explicitly (calculation performed) have a mean 222, a median 224, a standard deviation, and other statistical characteristics. In the context of linear regression, samples 126 have an origin 226 and a scale 228. Thresholds 230 may be present, such as a slope magnitude, a slope crossing frequency, a distance from the mean, and/or other thresholds 230. Analysis of samples 126 yields one or more trends 232.

With reference to FIGS. 1 and 2, some embodiments provide a computer system 102 with a logical processor 110 and a memory medium 112 configured by circuitry, firmware, and/or software to transform samples into trend determinations as described herein.

For example, some embodiments of a computer system 102 equipped with self-tuning resource usage leak detection include a logical processor 110, a memory 112 in operable communication with the logical processor, a plurality of resource usage sample points 128 residing in the memory (each sample point including a sample time 218 and an allocated resource usage size 216), and a self-tuning resource usage leak detection code 202 residing in the memory. Upon execution by the processor, the code 202 performs statistical trend analysis on at least a portion of the resource usage sample points. The system 102 also includes at least one of the following: (a) outlier resource usage sample points 128 excluded from trend analysis by a leak detection code 202 filter 206, (b) a plurality of linear regression slopes 214 based on at least some of the resource usage sample points, as well as a second order linear regression 208 that is based on the plurality of linear regression slopes, (c) a plurality of linear regression slopes 214 based on at least some of the resource usage sample points, as well as a derivative 210 of the plurality of linear regression slopes.

In some embodiments, the self-tuning resource usage leak detection code 202 includes a test to ascertain distance between a sample point and at least one of: a sample points mean 222, a sample points median 224. This test is used by the out-of-band exclusion mechanism 206.

In some embodiments, the system 102 includes a plurality of linear regression slopes 214 residing in the memory and based on at least some of the resource usage sample points.

These slopes may be used by the double smoothing mechanism 208, by the derivative mechanism 210, or by both.

In some embodiments, the system 102 includes a resource usage sample points regression slope 214 in the memory, and a regression slope magnitude threshold 230 in the self-tuning resource usage leak detection code. Other thresholds 230 may also be present.

In some embodiments, the system 102 includes a sample size selection-code 234 residing in the memory. Upon execution by the processor, the code 234 computationally selects (as opposed to having a user select) a sample size 130 for the plurality of resource usage sample points.

In some embodiments, the resource usage sample points 128 show usage of dynamically allocated memory 112, but other resources 140 may also (or alternately) be sampled and monitored as described herein. For example, in some embodiments the monitored resource(s) 140 include hard disk space. In some scenarios, a system 102 can become unavailable if enough drive space is not available. The paging file used for virtual memory can grow as memory pressure increases, or a process that writes data to a log file can consume too much drive space, for instance. To prevent the system from becoming unavailable, the used space on a hard disk can be monitored by leak detection code 202 and an indicator can be triggered by code 202 if the used space is increasing too quickly. The case of the paging file correlates closely to the volatile memory leak case. A constantly increasing paging file probably indicates a leak. In the case of a log file, a mechanism can be used to detect when too much space is used, to allow archiving the existing logs to another storage device and then freeing the local drive space for subsequent logging. If this mechanism is not working correctly or too slowly, a leak will be detected. Another use of leak detection is to monitor the growth in a load balancing system or a cloud computing service such as Microsoft® Azure™ services (marks of Microsoft Corporation). In these and similar systems, one resource 140 is the machines (virtual and/or physical) used to process the load. Typically some stable level of machines is called on to process the normal load, however there could be a spike in demand and more machines could be allocated to handle it. If this demand is constantly increasing, i.e., leaking, the system would eventually run out of machines available to handle the incoming load.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment in which computing services are not owned but are provided on demand. For example, applications and/or other resource users 120 may be on multiple devices/systems 102 in a networked cloud, usage samples 126 may be stored on yet other devices within the cloud, and the leak detection code 202 may configure display(s) on yet other cloud device(s)/system(s) 102.

Processes

Figure 3:
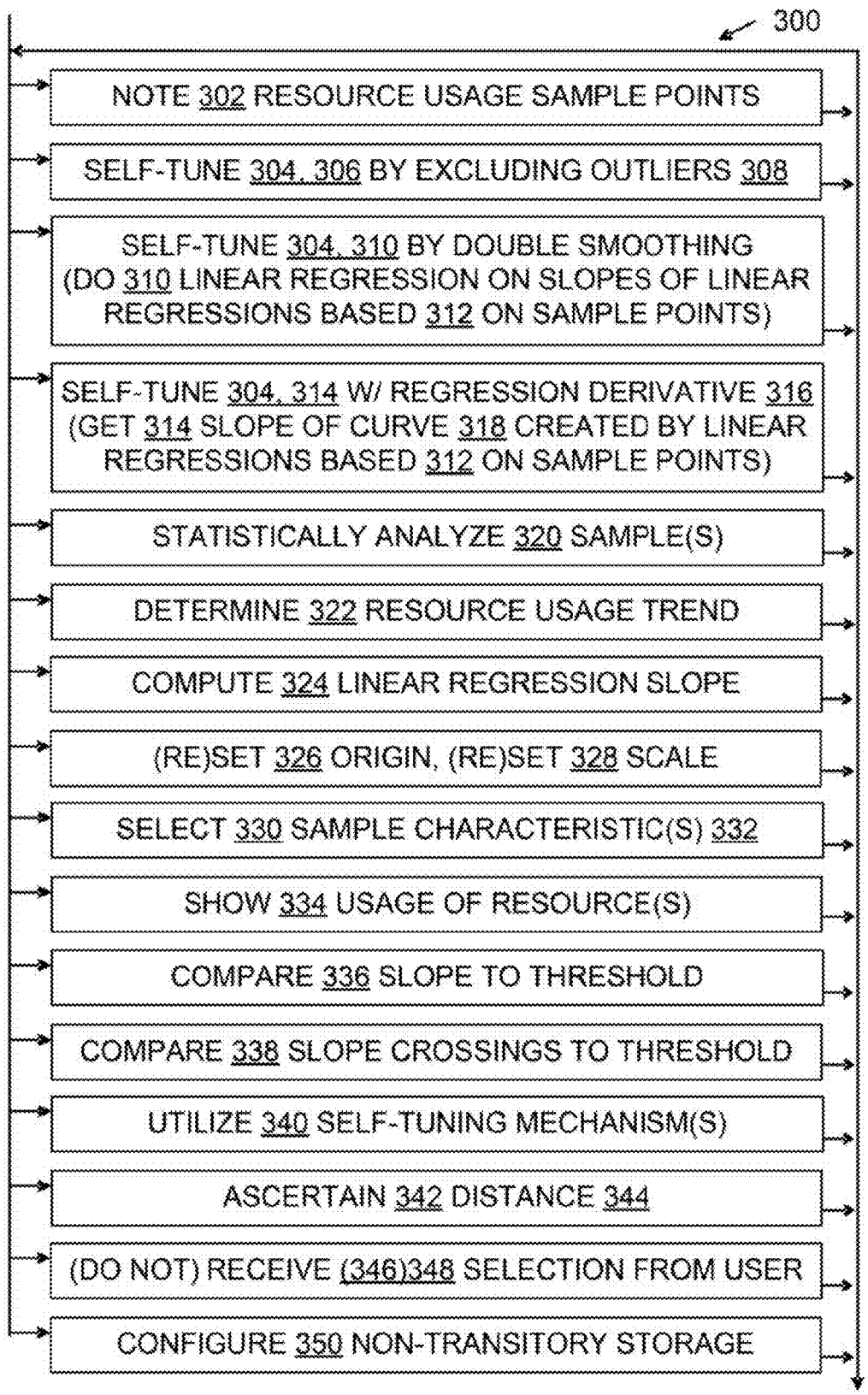
FIG. 3 is a flow chart illustrating steps of some process and configured storage medium embodiments.

FIG. 3 illustrates some process embodiments in a flowchart 300. Processes shown in the Figures may be performed in some embodiments automatically, e.g., by self-tuning leak detection code 202 in a watchdog process or otherwise requiring little or no contemporaneous live human user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

Some embodiments computationally and proactively perform self-tuned memory leak or other resource leak detection. A set of resource usage sample points 128 is presumed to be available or obtainable. The sample points show 334 usage of allocated resource(s) by resource user(s) 120 such as a coroutine, thread, task, interrupt handler, application, operating system driver, procedure, or object method, for example. Each sample point 128 includes a sample time 218 and a memory or other resource 140 usage size 216. The sample points have a mean 222, a median 224, a standard deviation, a sample size 130, a sampling rate 132, and other familiar statistical characteristics 332. Sample size and/or sample rate are set manually in some embodiments, and are computationally selected 330 (not given as user input) in some other embodiments.

After noting 302 (e.g., obtaining, reading, collecting) at least some of the sample points, some embodiments self-tune 304 noted sample points for leak detection by computationally proactively utilizing at least one of the following tuning mechanisms 204: (a) excluding 306 any noted sample point that is an outlier 308, namely, not located within a specified band (e.g., ascertained 342 to be outside a distance 344 of at least one standard deviation) of the mean or median, (b) double smoothing 310 noted sample points by performing a second order linear regression based on them, (c) identifying 314 a derivative 316 of a curve 318 created by a sequence of linear regression slopes. Two or all three self-tuning mechanisms may be utilized 340 in a given embodiment. Tuning and/or other analysis 320 may be implemented by a self-tuning resource usage leak detection code 202 residing in a memory and executable by a processor. The embodiments statistically analyze 320 a tuning mechanism result, thereby computationally proactively determining 322 what trend 232 is shown by the analyzed sample points. A trend 232 may be upward, steady (basically flat), downward, or inconclusive (no clear trend that is up, down, or steady).

For example, some embodiments proactively compute 324 a linear regression slope 214 that has an absolute value greater than zero and less than 0.2, and the analysis 320 determines that noted resource usage sizes are holding steady rather than trending upward. A threshold 230 other than 0.2 may also be used. Thresholds 230 may be set manually by a user (received 348), or determined automatically 346 by an embodiment.

In some embodiments, analysis 320 compares 336 a linear regression slope 214 to a slope magnitude threshold 230 at which the regression slope realizes an upward trend 232. In some, analysis 320 compares 336 the linear regression slope to a slope magnitude threshold, and the regression slope realizes an upward trend only after comparison 338 show the slope 214 crossing the slope magnitude threshold at least a slope frequency threshold 230 number of times. The slope frequency threshold 230 is greater than one in these embodiments.

In some embodiments, noted sample times include t values which occur at a constant time interval 220 and have a median 224. In some such cases, the analysis 320 is optimized in that analysis proactively computes 324 a linear regression slope at least in part by resetting 326 an origin 226 to the median of the t values and setting 328 a scale 228 to the constant time interval of the t values. For present purposes, step 326 may be viewed as setting or resetting the origin, and similarly step 328 may be viewed as setting or resetting the scale.

Configured Media

Some embodiments include a configured 350 computer-readable storage medium 112. Medium 112 may include disks (magnetic, optical, or otherwise), RAM, EEPROMS or other ROMs, and/or other configurable memory, including in particular computer-readable media (as opposed to propagated signal media). The storage medium which is configured may be in particular a removable storage medium 114 such as a CD, DVD, or flash memory. A general-purpose memory, which may be removable or not, and may be volatile or not, can be configured into an embodiment using items such as self-tuning mechanism(s) 204, leak detection code 202, sample size selection code 234, regression derivatives 210, and/or second order linear regressions 208, in the form of data 118 and instructions 116, read from a removable medium 114 and/or another source such as a network connection, to form a configured medium. The configured medium 112 is capable of causing a computer system to perform process steps for transforming data through self-tuned leak detection as disclosed herein. FIGS. 1 through 3 thus help illustrate configured storage media embodiments and process embodiments, as well as system and process embodiments. In particular, any of the process steps illustrated in FIG. 3, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

By way of introduction, it will be understood that the stability of long-running applications or services can be impeded by various factors. Some embodiments described herein address one of those factors, namely memory leaks. A memory leak can be defined as an increasing trend in memory footprint. This can be caused by various elements in the process, some of which may be third party components. Some embodiments described herein use statistical methods to determine if there is a consistent upward trend in memory allocations that is not balanced by an equal number of deallocations.

Least Squares Linear Regression

Least squares linear regression can be used to determine a relationship between two variables. Although often used to predict future values, for memory leak detection some embodiments use it to detect a trend. The independent variable is time and the dependent variable is the size of memory or other resource 140 for a process. If the slope is greater than zero then memory allocations are increasing, if the slope is less than or equal to zero then memory allocations are either stable or decreasing. A threshold 230 may be used to allow for normal fluctuation of memory usage.

A familiar calculation for least squares linear regression includes two equations, one to calculate the slope of the regression line and the other to calculate the y-intercept. For present purposes, the calculation of interest is the slope, which is calculated as follows:

$$m = \frac{n\sum xy - \sum x \sum y}{n\sum x^2 - \sum x \sum x} \quad (1)$$

The x values are the time stamps of each sample and the y values are the size of memory at the sample time. One characteristic of the x values is that they are evenly spaced and their actual value can be ignored if they are increasing at a constant interval. One can then make an optimization in the slope calculation. A linear transformation is made by setting 326 the origin to the median of the x values and setting 328 the scale to the difference of the x values. This can be done with the following equation:

$$u = \frac{(x - A)}{w} \quad (2)$$

After performing this linear transformation, the sum of x values is zero. This allows one to reduce the equation (2) to this:

$$m_u - \frac{\sum uy}{\sum u^2} \quad (3)$$

Detecting Memory Leaks

Conceptually, the slope 214 of the least squares regression of memory samples for a specific period can be used to detect when the memory footprint of a process is increasing. If the slope is greater than zero, there is an upward trend in the values in the sample and there may be a leak. If the slope is less than zero, then there is a downward trend in the values, and if the slope is zero there is no change in the trend. As a practical matter, however, there are complications which make the foregoing simple approach inadequate for many real-world situations.

Reducing False Positives

One complication is that there are some periods during the lifetime of a process where the allocated memory fluctuates due to normal behavior of the program 122. For example, when a process starts, it will normally begin to allocate many of the resources 140 it will use to perform its work. Other resources 140 are allocated lazily after the process has been running for some time. If one computes the linear regression over all of the samples, the slope of the line can be influenced by these outliers. Thus, one or more mechanisms are used to stabilize the samples and/or to only include those samples that indicate a reliable pattern of memory use.

Using Thresholds

One method of reducing false positives is to wait for the slope 214 to increase beyond a specified threshold 230, to eliminate normal jitter in the memory samples, e.g., per step 336. This threshold can be tuned (automatically and/or manually) for the typical use of the process that is being monitored. Another method to help ensure a valid leak detection is to confirm that the slope is positive and over the threshold for a certain number of samples, e.g., per step 338. This will help prevent whipsawing introduced by wildly fluctuating values.

Handling Outliers

A more flexible approach to reduce false positives is to filter outliers that fall outside an acceptable band of values, e.g., per step 306. This band of values is determined in some embodiments by the standard deviation of the sample values. The standard deviation is computed with these equations:

$$s = \sqrt{\frac{\sum x^2}{n} - \bar{x}^2}, \bar{x} = \frac{\sum x}{n} \tag{4}$$

The standard deviation is used in some embodiments as a threshold 230 value when selecting values 216 for the linear regression, e.g., per steps 306, 342. If the value of a sample exceeds the mean of the memory samples by one standard deviation (for example, other distances 344 may also be used), that sample will not be included in the regression calculation. An inclusion condition to be satisfied when the distance is one standard deviation is accordingly:

$$|x - \bar{x}| < s \tag{5}$$

Filtering the values in this way helps eliminate the influence of values that are not characteristic of the long term behavior of the memory usage for the process or other user 120 being monitored. Thus, the result of the linear regression will be less likely to generate false positive indications. In some embodiments, this filtering automatically adapts to the value range of the samples and no manual tuning is employed.

Adjusting Parameters

Some parameters can be tuned for specific environments and workloads. For example, if a service experiences bursts of activity at wide intervals, the sample period (interval 220) can be tuned to match this pattern. More generally, the rate at which samples are collected can be tuned to match the granularity of activity of the observed process (user 120). For a long running process, setting the sample rate to a wider interval would give a more diverse set of samples. This would also reduce the size of the data (points 128) collected and maintained at any one time. The number of samples (sample size 130) used to calculate the linear regression 212 can be defined based on the expected behavior of the services being monitored. Sample size 130 can be tuned together with the sample rate 132. As the number of samples varies, the rate of sampling might also be varied in order to cover a desired timeframe. The minimum number of samples available for the linear regression calculation to be meaningful may be the same as the sample size. However, some scenarios might provide valid statistics after a minimum level of samples is available. For these instances, processing could start earlier in order to yield a preliminary slope 214. As time progresses, the initial sample 126 would increase until it reaches the desired sample size 130.

Some embodiments provide a self-tuning memory leak detector which accepts a set of sample points (t, m) where t is a time 218 and m is a memory size 216 at time t. The memory leak detector code 202 tunes itself automatically to improve its accuracy. Code 202 also uses a linear regression to analyze 320 the sample points to determine whether the memory size is trending up, holding steady, or trending down. If the sample points occur at a constant time interval, the slope calculation can be optimized by resetting the origin to the median of the t values and the scale to the difference of the t values. The self-tuning is done by one or both of the following: (a) excluding 306 any sample that is not within one standard deviation of the mean of the samples, (b) performing 310 a second order linear regression.

In a variation, memory size is automatically considered to be holding steady and the regression slope 214 has an absolute value greater than zero and less than 0.2. The value 0.2 can be inferred from the FIG. 4 example of a slow leak. Other variants may specify different threshold 230 values. Also, note that this can be viewed as different from a single threshold of 0.2, namely, as a range of thresholds (0.0 . . . 0.2) because a threshold of 0.15 for instance would also conform with this set of conditions.

In another variation, a slope magnitude threshold 230 indicates a value at which the regression slope is considered trending up. This slope magnitude threshold is manually tuned in some cases, and automatically calculated in others. In another variation; a slope magnitude threshold and a slope frequency threshold are used, such that the regression slope is considered trending up only after crossing the slope magnitude threshold at least a slope frequency threshold number of times. The thresholds are manually tuned in some cases, and automatically calculated in others.

In some variants, "process" (namely, the resource user 120) is defined broadly to include coroutines, threads, tasks, interrupt handlers, applications, operating system drivers, procedures, object methods, etc., because the technology described herein could be used to detect memory leaks in any of those items.

Some variants automate the threshold 230 settings which would otherwise be set through manual tuning, possibly with a lot of trial and error. One approach is to use 306 the standard deviation of the memory samples to create a band around them. This band can be used to filter out samples 308 that might skew the linear regression line and generate false positives.

With further attention to automating selection 330 of the sample size 130 and rate 132, in some variants the sample size is large enough to cover an initial ramp-up of the user 120 that is being monitored and the rate is frequent enough to catch the peaks and valleys. One way to automate selection 330 is to collect samples from previous runs and to record the time it takes respective slopes 214 to stabilize. Stability may be defined either as sufficiently unchanging trend status (up vs.

steady vs. down) or as sufficiently unchanging slope 214. Sufficiency is defined as no change for a previously specified time period (built-in or administrator configured), and in the case of sufficiently unchanging slope as a tolerance for slope changes (absolute or percentage; built-in or configured). Selection 330 automation initially uses a very high frequency sample rate 132 and then reduces it on subsequent runs to match the fluctuations in the recorded samples. The sample size 130 can then be determined by taking the largest of the stabilization times and dividing it by the sample rate that was determined in the previous tests.

In some variants, thresholds 230 can be largely or entirely eliminated when the second order regression 208 mechanism is utilized 340. Some successful tests by the inventor used 0 as the threshold when testing with random spikes in memory usage. The first order slopes would become positive if the spike was prolonged, but the second order didn't indicate a crossover unless the increase lasted for a much longer time.

Those of skill will understand that second order regression is different than multilinear regression. Multilinear regression performs linear regressions on different variables of a sample space and then finds their correlation. But second order regression as described here uses a single variable, the size of memory (or another resource 140) at the time of sampling. Second order regression is more reminiscent of cases in calculus where a double differentiation is done. This is called the second order derivative, which is how the inventor coined the term "second order" regression—second order regression involves computing a linear regression on the slope values returned by previous linear regressions. So the variable in the second order regression is not related to another variable but is processing the results of the original variable (size 216).

Using the slope of the linear regression directly to detect memory leaks can be sensitive to sporadic spikes in memory usage and indicate false detections. There are manual methods to reduce these false detections such as using a threshold value for the slope of the linear regression that is based 312 on noted sample points. The threshold would indicate a specific value that the slope would have to cross before it is considered a detection. Another method is to count the number of crossings and compare that value to a threshold. However, these thresholds may require manual tuning to get right, which can be error-prone and time consuming.

Accordingly, some variants perform a "double smoothing" by computing a second order linear regression of the slopes. This is done 310 by collecting the slopes 214 of the linear regressions based 312 on samples as each sample 126 or portion thereof is added. The size of this sample set can be the same as the sample size of the memory usage values. A linear regression is performed on this collection of slopes, which returns a less volatile value that can be tested for trending. This double smoothed regression slope is much less sensitive to spurious memory spikes and is operable without manual tuning.

As for the regression slopes derivative mechanism 210, some variants use the slope of the line tangent to the curve 318 created by the collection of regression slopes 214. Instead of computing 310 a second order regression on the collection of slopes, these variants compute 314 the derivative of the slope values. This line seems to be very stable and has operated successfully in testing without thresholds.

Figures Illustrating Memory Allocation Patterns

Figure 4:
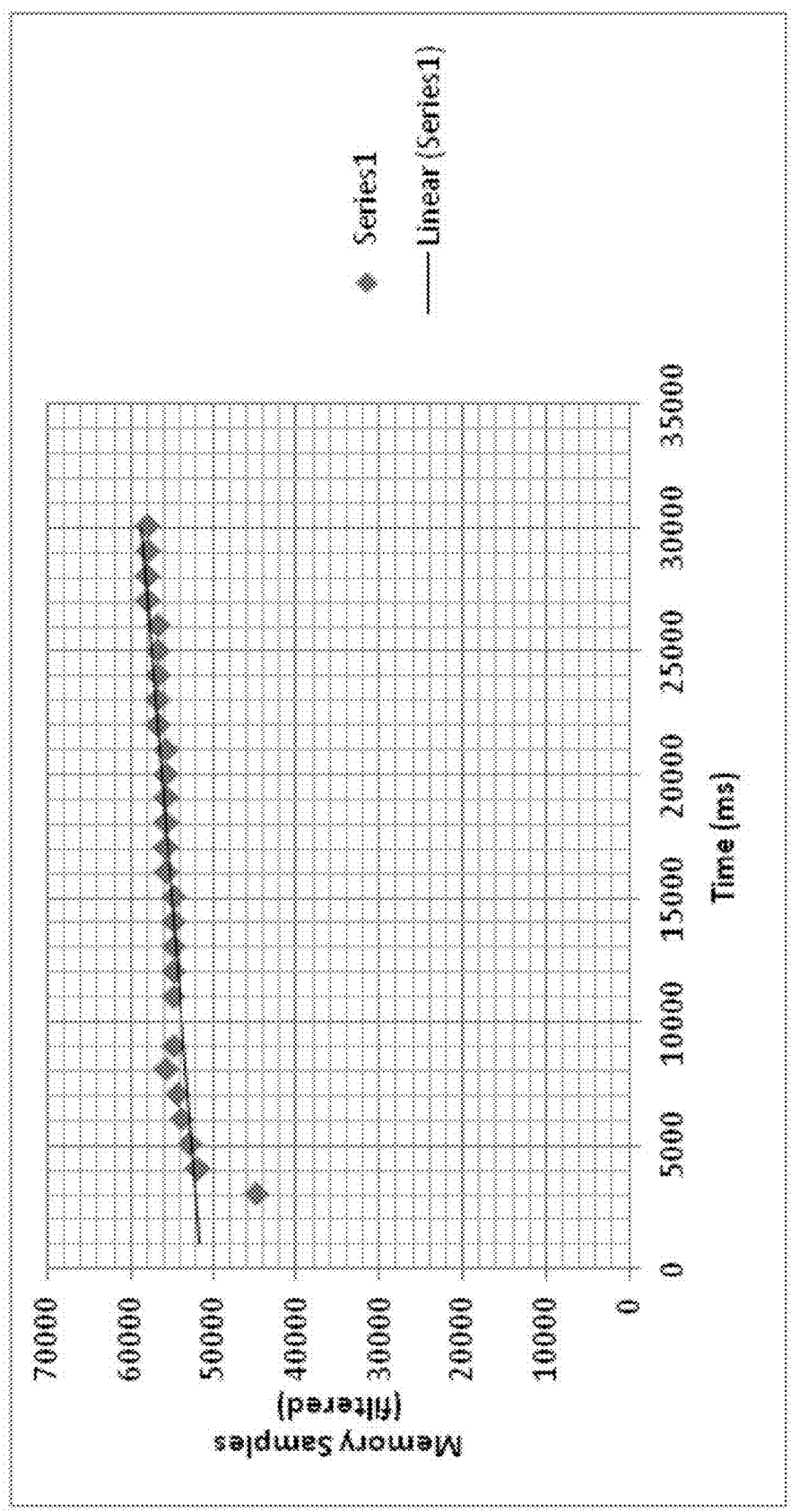
FIG. 4 is a diagram illustrating a filtered set of sample points showing a slow memory leak.
Figure 5:
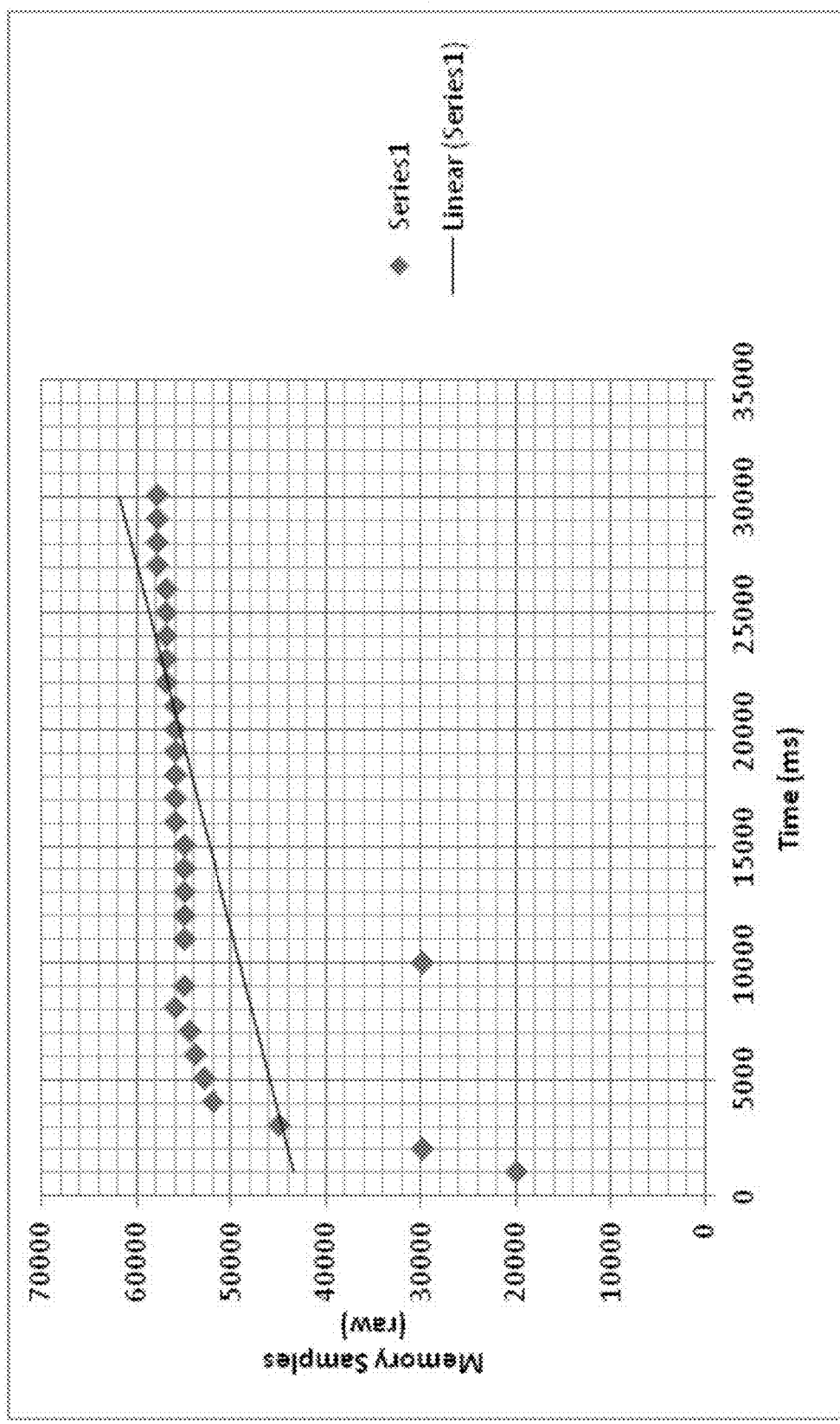
FIG. 5 is a diagram illustrating raw sample points from which FIG. 4 was derived.

The diagrams in FIGS. 4-11 illustrate various common memory allocation patterns that occur in various scenarios. FIGS. 4 and 5 show a process that is slowly leaking memory. The diagrams show both the filtered 306 samples (FIG. 4) as well as the raw sample data (FIG. 5). The slope of the linear regression is positive, which indicates that memory usage is increasing (upward trend 232).

Figure 6:
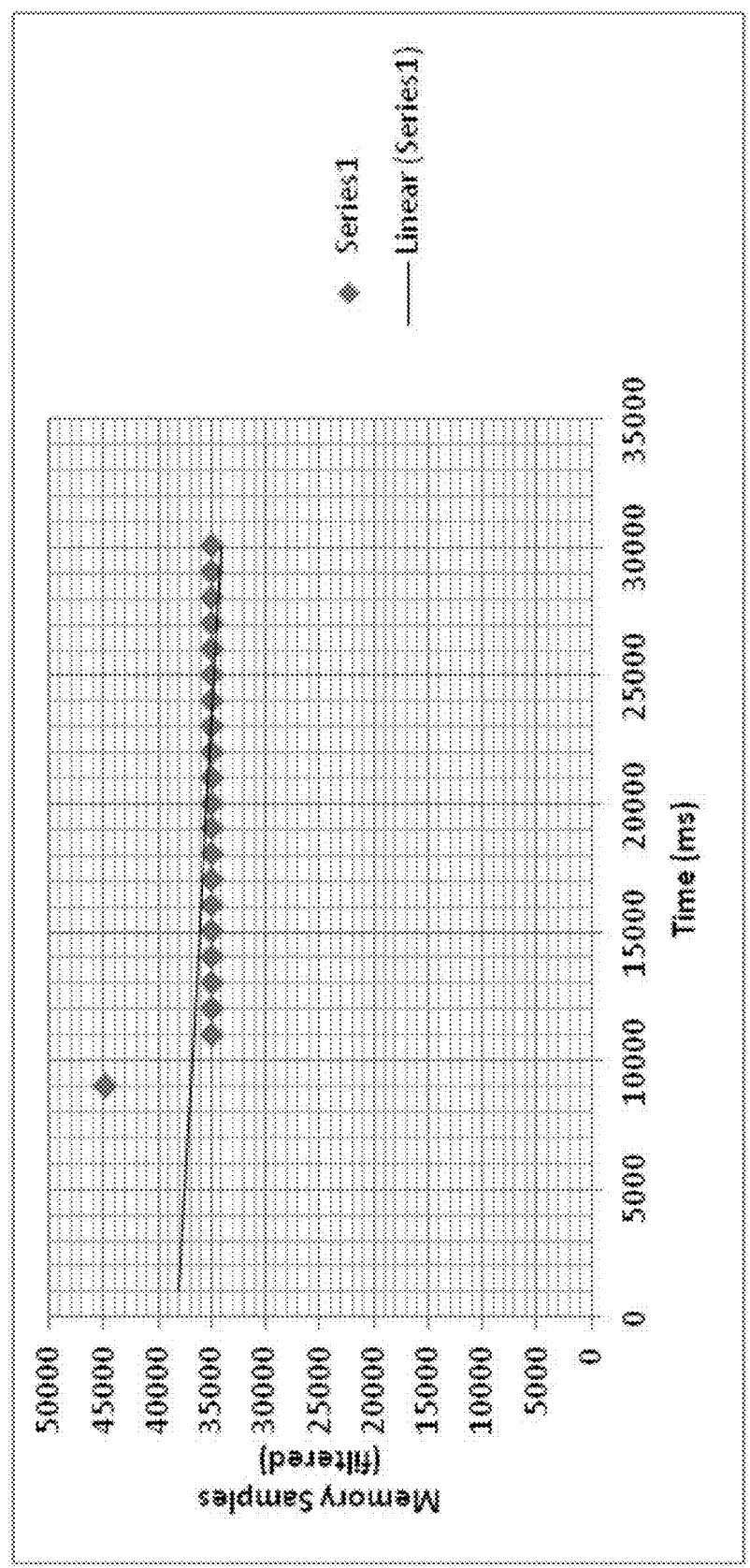
FIG. 6 is a diagram illustrating a filtered set of sample points showing an early spike in memory usage which then subsides into flat usage.
Figure 7:
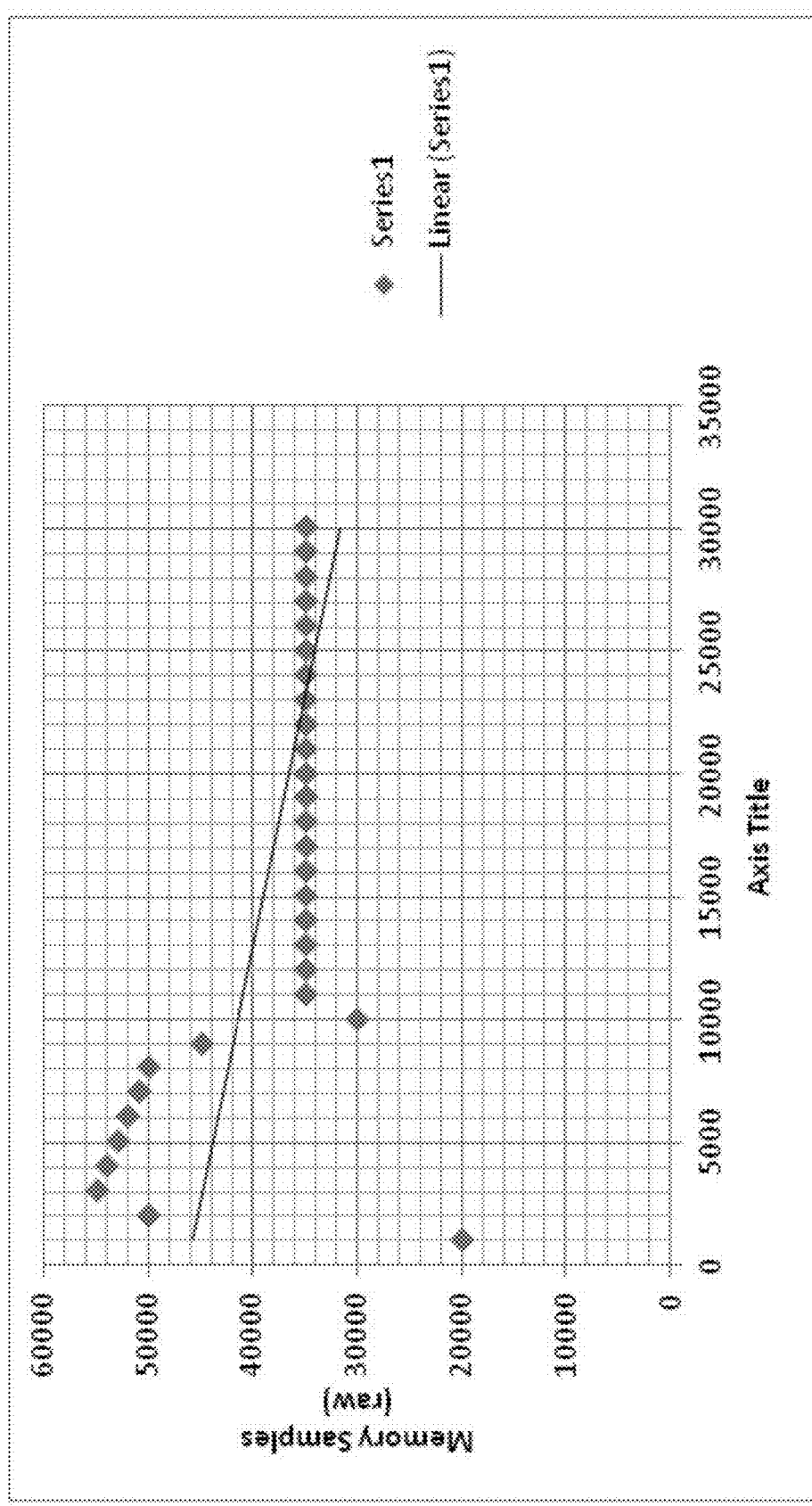
FIG. 7 is a diagram illustrating raw sample points from which FIG. 6 was derived.

FIGS. 6 and 7 show a scenario where there is an early spike in memory usage which subsequently subsides into a pattern of flat memory usage. In such a scenario the spike(s) can influence the slope 214 of the linear regression to point downward. An out-of-band filtering mechanism 206 will eliminate the strongest outliers and soften the effect of the spike.

Figure 8:
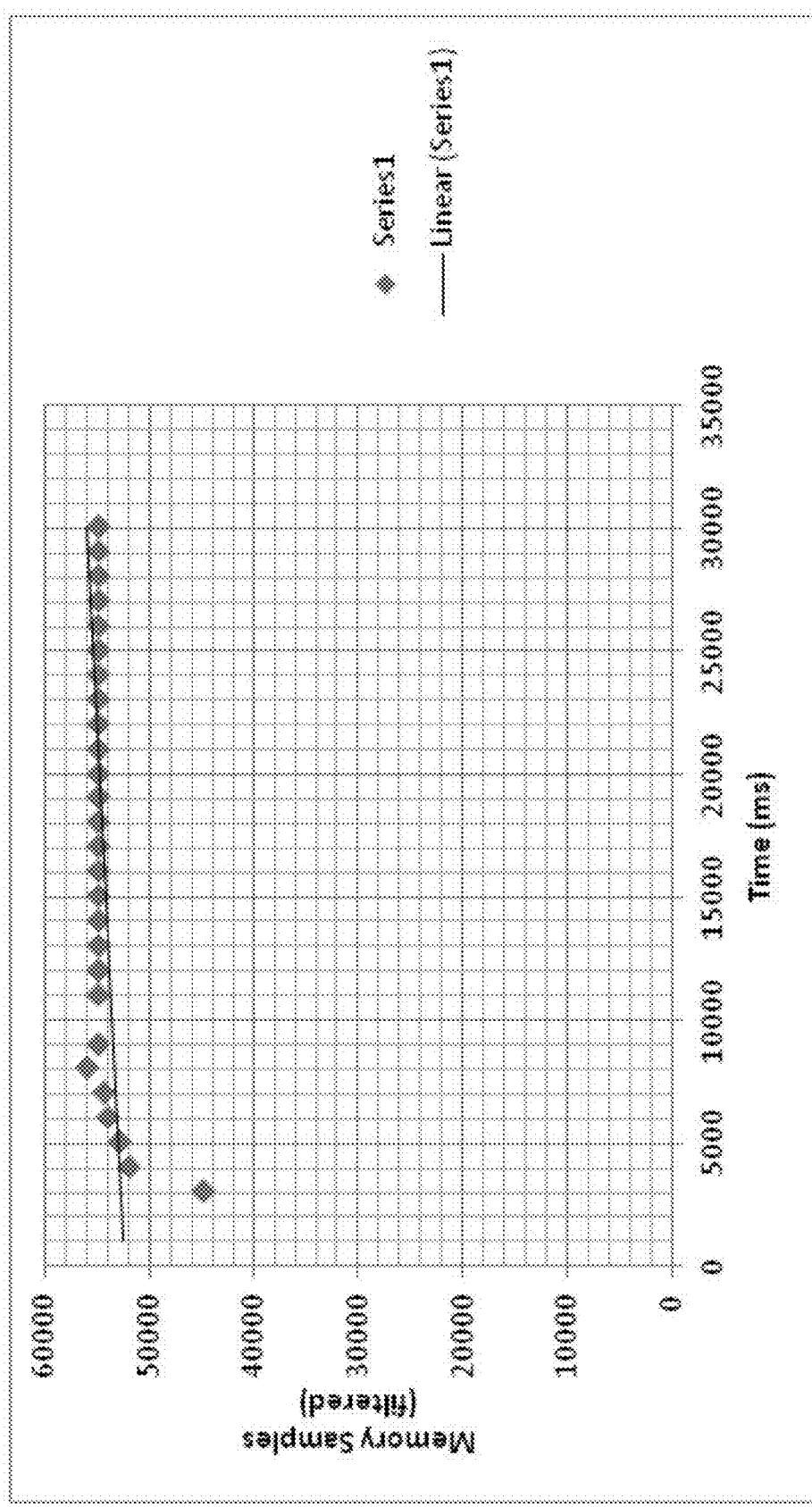
FIG. 8 is a diagram illustrating a filtered set of sample points showing an initial ramp-up in memory usage which then subsides into flat usage.
Figure 9:
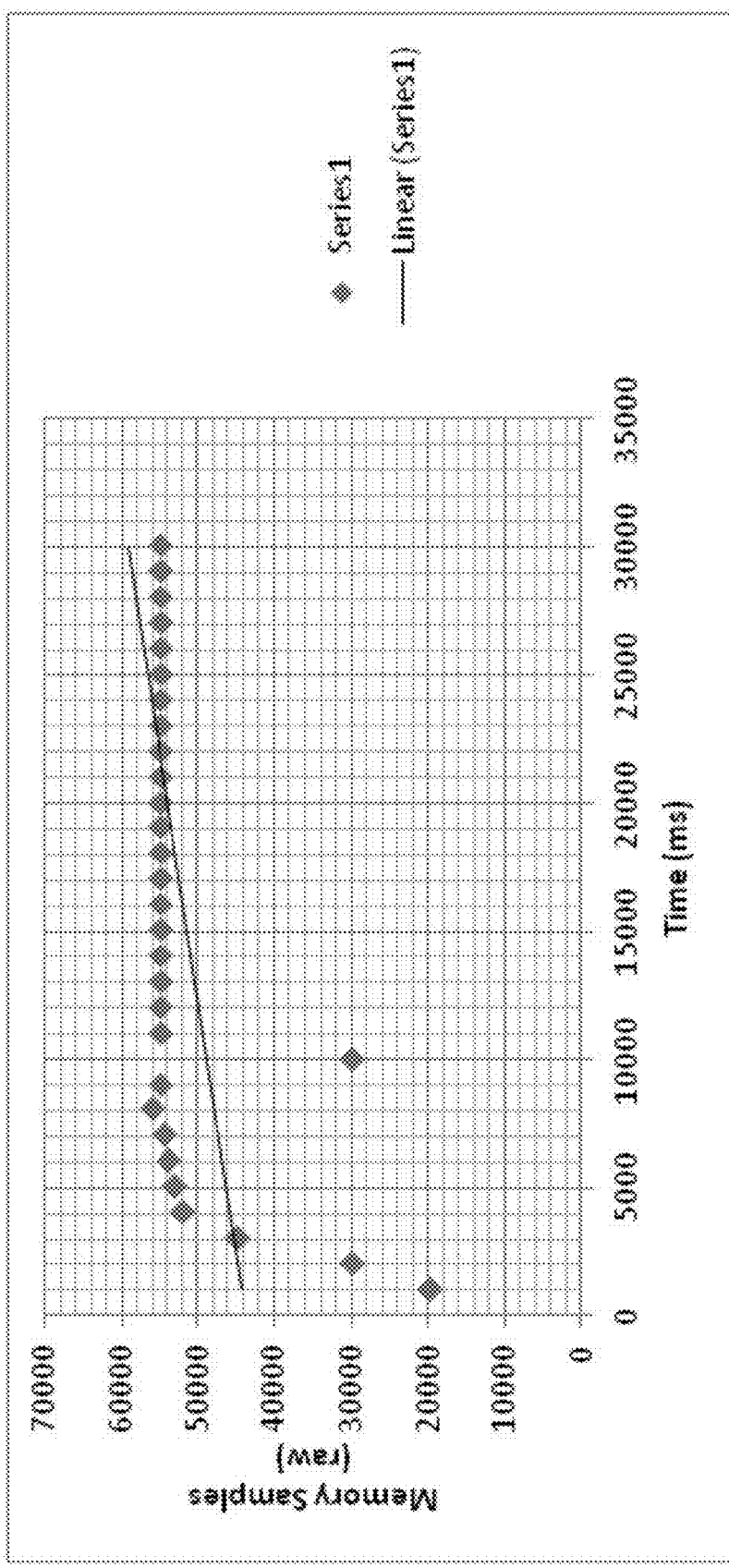
FIG. 9 is a diagram illustrating raw sample points from which FIG. 8 was derived.

FIGS. 8 and 9 show a more common scenario which can also be problematic. Here, there is an initial ramp-up of memory usage followed by flat memory usage. This can cause a false positive as the slope 214 is influenced in the positive direction. A filtering mechanism 206 can reduce the influence of the early samples that occurred during the initial ramp-up and reduce the risk of false positives.

Figure 10:
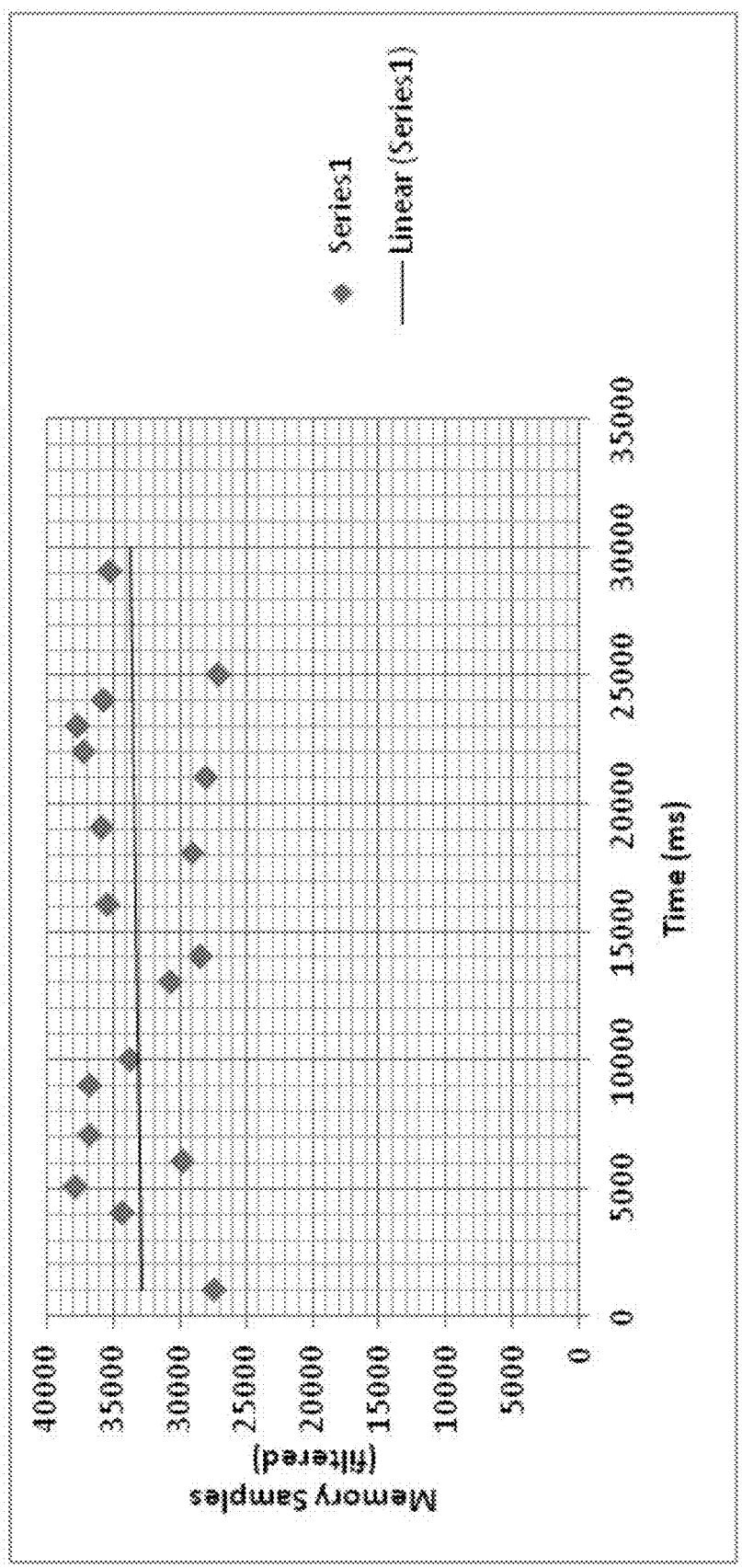
FIG. 10 is a diagram illustrating a filtered set of sample points showing memory usage which is distributed more randomly around a trend line than earlier examples.
Figure 11:
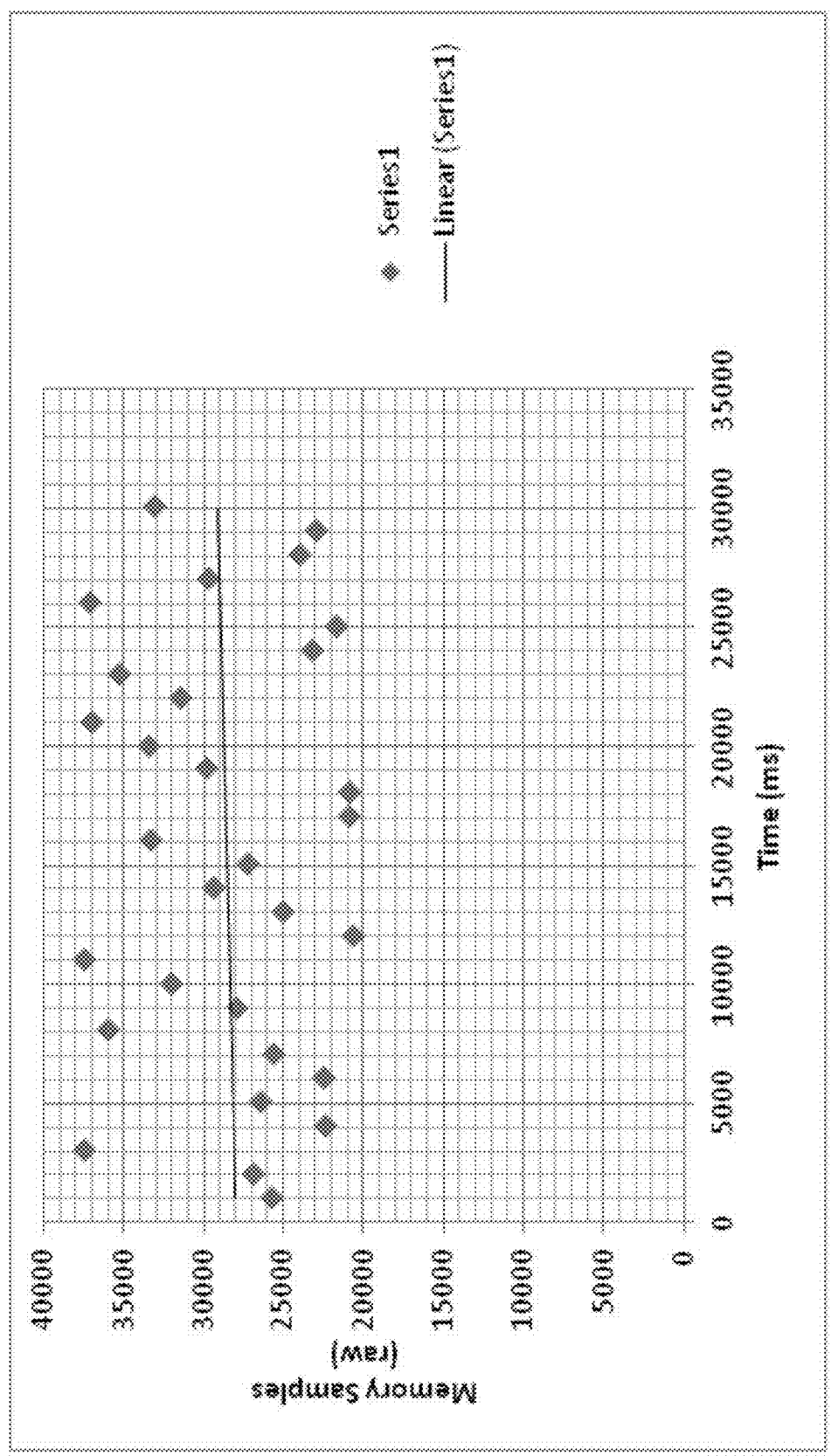
FIG. 11 is a diagram illustrating raw sample points from which FIG. 10 was derived.

FIGS. 10 and 11 show the relatively common case of an erratic (bouncing) memory usage pattern in which linear regression alone (that is, without mechanism(s) 204) performs adequately. Here memory samples are distributed (near-)randomly and do not improperly influence the slope 214 of the regression. If the sample points 128 are biased in any direction, then they will cause the regression slope to indicate the direction of the bias.

CONCLUSION

Self-tuned detection of memory leaks or other resource leaks is described. Sample size and sample rate are set manually or computationally selected. Self-tuning leak detection code uses one or more self-tuning mechanisms to exclude outlier sample points, to perform a second order linear regression, and/or to identify a derivative of a sequence of linear regression slopes. Statistical analysis computationally proactively determines what trend is present: upward, steady, or downward. Analysis may compare a linear regression slope to a threshold at which the slope realizes an upward trend, possibly only after crossing the threshold a specified number of times. Regression calculation may be optimized by setting an origin to the median of the time values and setting a scale to their constant time interval. A watchdog may use self-tuned detection to monitor processes, for efficiently recycling processes to prevent problems caused by resource loss.

Although particular embodiments are expressly illustrated and described herein as processes, as configured media, or as systems, it will be appreciated that discussion of one type of embodiment also generally extends to other embodiment types. For instance, the descriptions of processes in connection with FIG. 3 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computational proactive process for self-tuned memory leak detection, comprising the steps of:
    noting multiple memory usage sample points which show memory usage for a computational service, each noted sample point including a sample time and a memory size, the noted sample points having a mean;
    tuning at least some of the noted sample points for memory leak detection by computationally proactively doing at least one of the following: (a) double smoothing noted sample points, (b) identifying a derivative of a sequence of a plurality of linear regression slopes;
    statistically analyzing at least one result of the tuning step, thereby computationally proactively determining whether noted memory sizes are trending upward; and
    terminating the computational service at least in part in response to a determination that memory sizes are trending upward.

2. The self-tuned memory leak detection process of claim 1, wherein the analyzing step comprises proactively computing a linear regression slope that has an absolute value greater than zero and less than 0.2, and the analyzing step determines that noted memory sizes are holding steady rather than trending upward.

3. The self-tuned memory leak detection process of claim 1, wherein noted sample times include t values which occur at a constant time interval and have a median, and wherein the analyzing step comprises proactively computing a linear regression slope at least in part by resetting an origin to the median of the t values and setting a scale to the constant time interval of the t values.

4. The self-tuned memory leak detection process of claim 1, further comprising computationally selecting (as opposed to receiving as a user input) at least one of the following sample characteristics: sample size, sample rate.

5. The self-tuned memory leak detection process of claim 1, wherein the tuning step comprises computationally proactively excluding any noted sample point that is not within one standard deviation of the mean.

6. The self-tuned memory leak detection process of claim 1, wherein the tuning step comprises computationally proactively double smoothing by performing a second order linear regression based on noted sample points.

7. The self-tuned memory leak detection process of claim 1, wherein the tuning step comprises computationally proactively identifying a derivative of a sequence of linear regression slopes.

8. A computer-readable storage medium configured with data and with instructions that when executed by at least one processor causes the processor(s) to perform a computational proactive process for self-tuned allocated resource usage leak detection, the computer-readable storage medium including one or more of the following physical media: volatile memory, non-volatile memory, fixed in place media, removable media, magnetic media, optical media, CD, DVD, memory stick, flash memory, RAM, ROM, hard disk, magnetic disk, optical disk, EEPROM, the process comprising the steps of:
    noting multiple resource usage sample points which show usage of an allocated resource, each noted sample point including a sample time and an allocated resource usage size, the noted sample points having a mean;
    tuning at least some of the noted sample points for allocated resource usage leak detection by computationally proactively utilizing at least one of the following self-tuning mechanisms: (a) performance of a second order linear regression based indirectly on noted sample points, (b) identification of a derivative of a sequence of a plurality of linear regression slopes;
    statistically analyzing at least one result of the tuning step by proactively computing a linear regression slope and then using the slope in determining whether noted resource usage sizes have a trend; and
    controlling another computational process in response to said determining whether noted resource usage sizes have a trend.

9. The configured medium of claim 8, wherein the resource usage sample points show usage of at least one of the following allocated resources: volatile memory, persistent memory.

10. The configured medium of claim 8, wherein the resource usage sample points show usage of at least one of the following allocated resources: disk space, machines in a load balancing system, machines in a cloud computing service.

11. The configured medium of claim 8, wherein the resource usage sample points show usage of at least one allocated resource by at least one of the following: a coroutine, a thread, a task, an interrupt handler, an application, an operating system driver, a procedure, an object method.

12. The configured medium of claim 8, wherein the analyzing step comprises comparing the linear regression slope to a slope magnitude threshold at which the regression slope realizes an upward trend.

13. The configured medium of claim 8, wherein the analyzing step comprises comparing the linear regression slope to a slope magnitude threshold, and the regression slope realizes an upward trend only after crossing the slope magnitude threshold at least a slope frequency threshold number of times, the slope frequency threshold being greater than one.

14. The configured medium of claim 8, wherein the analyzing step comprises computationally proactively utilizing at least two of the self-tuning mechanisms.

15. A computer system equipped with self-tuning resource usage leak detection, the system comprising:
- a logical processor;
- a memory in operable communication with the logical processor;
- a plurality of resource usage sample points residing in the memory, each sample point including a sample time and an allocated resource usage size;
- a self-tuning resource usage leak detection code residing in the memory, which upon execution by the processor (i) performs statistical trend analysis on at least a portion of the resource usage sample points, and (ii) in response to the statistical trend analysis, indicates when a service using the resource should be recycled; and
- wherein the system also comprises at least one of the following: (a) a plurality of linear regression slopes based on at least some of the resource usage sample points, as well as a second order linear regression that is based on the plurality of linear regression slopes, (b) a plurality of linear regression slopes based on at least some of the resource usage sample points, as well as a derivative of the plurality of linear regression slopes.

16. The system of claim 15, wherein the self-tuning resource usage leak detection code comprises a test to ascertain distance between a sample point and at least one of: a sample points mean, a sample points median.

17. The system of claim 15, wherein the system comprises a plurality of linear regression slopes residing in the memory and based on at least some of the resource usage sample points.

18. The system of claim 15, wherein the system further comprises a resource usage sample points regression slope in the memory, and a regression slope magnitude threshold in the self-tuning resource usage leak detection code.

19. The system of claim 15, wherein the system further comprises a sample size selection code residing in the memory which upon execution by the processor computationally selects (as opposed to having a user select) a sample size for the plurality of resource usage sample points.

20. The system of claim 15, wherein the resource usage sample points show usage of dynamically allocated memory.

* * * * *